United States Patent
Neuhaus et al.

(10) Patent No.: US 8,863,994 B2
(45) Date of Patent: *Oct. 21, 2014

(54) DISPENSING DEVICE

(75) Inventors: Reinhard Neuhaus, Hemer (DE);
Reiker Canfield, Crystal Lake, IL (US);
Bernd Blumenstein, Dortmund (DE)

(73) Assignee: Aptar Dortmund GmbH, Dortmund (DE)

(*) Notice: Subject to any disclaimer, the term of this patent is extended or adjusted under 35 U.S.C. 154(b) by 723 days.

This patent is subject to a terminal disclaimer.

(21) Appl. No.: 12/530,736

(22) PCT Filed: Mar. 17, 2008

(86) PCT No.: PCT/EP2008/002117
§ 371 (c)(1),
(2), (4) Date: Jan. 5, 2010

(87) PCT Pub. No.: WO2008/110387
PCT Pub. Date: Sep. 18, 2008

(65) Prior Publication Data
US 2010/0147898 A1   Jun. 17, 2010

(30) Foreign Application Priority Data

Mar. 15, 2007 (DE) .......................... 10 2007 013 130
Oct. 17, 2007 (DE) .......................... 10 2007 049 614

(51) Int. Cl.
*B65D 83/00* (2006.01)
*B05B 11/00* (2006.01)
(Continued)

(52) U.S. Cl.
CPC .......... *B05B 11/0027* (2013.01); *B65D 83/205* (2013.01); *B65D 83/206* (2013.01); *B65D 83/201* (2013.01); *A45D 34/04* (2013.01);
(Continued)

(58) Field of Classification Search
CPC .............. B05B 11/0027; B05B 11/007; B05B 11/0072; B05B 11/3053; B29C 45/1657; B29C 45/1676; B65D 83/201; B65D 83/205–83/207; B65D 83/7535
USPC ............... 222/402.13, 402.15, 491, 494, 517, 222/527–529, 207
See application file for complete search history.

(56) References Cited

U.S. PATENT DOCUMENTS 1,881,488 A * 10/1932 Gleason ........................ 222/494
2,500,687 A    3/1950 Kamp et al.
(Continued)

FOREIGN PATENT DOCUMENTS

DE    2043415    9/1970
DE    2920497    11/1980
(Continued)

OTHER PUBLICATIONS

U.S. Appl. No. 13/529,109, filed Jun. 21, 2012, Canfield.
(Continued)

*Primary Examiner* — J. Casimer Jacyna
(74) *Attorney, Agent, or Firm* — Jason H. Vick; Sheridan Ross, PC

(57) ABSTRACT

The invention relates to a dispensing device, particularly a dispensing head proposed for preferably cosmetic liquid. A simple, tightly closing structure of an outlet valve is achieved in that a valve element is injected onto a wall and/or lies thereon with its entire surface or flat surface when the valve is closed and/or the valve element covers an outlet opening on the flat side. Alternatively or in addition, the valve element is pretensioned into a closed position when the valve is closed.

43 Claims, 10 Drawing Sheets

(51) Int. Cl.
*B65D 83/20* (2006.01)
*B29C 45/16* (2006.01)
*B65D 83/14* (2006.01)
*B65D 83/22* (2006.01)
*A45D 34/04* (2006.01)

(52) U.S. Cl.
CPC ........... *B05B 11/007* (2013.01); *B05B 11/0072* (2013.01); *B05B 11/3053* (2013.01); *B29C 45/1657* (2013.01); *B29C 45/1676* (2013.01); *B65D 83/207* (2013.01); *B65D 83/7535* (2013.01); *B65D 83/22* (2013.01)
USPC ................. 222/402.13; 222/402.15; 222/494; 222/517; 222/529

(56) References Cited

U.S. PATENT DOCUMENTS

| | | | |
|---|---|---|---|
| 2,714,475 A | 8/1955 | Roehrich |
| 2,721,010 A | 10/1955 | Meshberg |
| 2,736,930 A | 3/1956 | Longley |
| 2,772,819 A | 12/1956 | Poarch et al. |
| 2,812,884 A | 11/1957 | Ward |
| 2,837,249 A | 6/1958 | Meshberg |
| 2,884,164 A | 4/1959 | Kleid |
| 2,980,301 A | 4/1961 | Gorter |
| 3,018,928 A | 1/1962 | Meshberg |
| 3,073,489 A | 1/1963 | Friedman |
| 3,104,785 A | 9/1963 | Beard, Jr. |
| 3,131,834 A | 5/1964 | Meshberg |
| 3,154,224 A | 10/1964 | Wakeman |
| 3,155,291 A | 11/1964 | Wakeman |
| 3,162,333 A | 12/1964 | Davidson |
| 3,258,369 A | 6/1966 | Blaich |
| 3,286,885 A | 11/1966 | Huling |
| 3,323,695 A | 6/1967 | Monahon |
| 3,337,096 A | 8/1967 | Brown |
| 3,385,482 A | 5/1968 | Frangos |
| 3,507,586 A | 4/1970 | Gronemeyer et al. |
| 3,511,418 A | 5/1970 | Venus, Jr. |
| 3,542,253 A | 11/1970 | Weber et al. |
| 3,608,830 A | 9/1971 | Ramella |
| 3,642,179 A | 2/1972 | Micallef |
| 3,672,543 A | 6/1972 | Roper et al. |
| 3,698,961 A | 10/1972 | Niemann |
| 3,705,667 A | 12/1972 | Blanie et al. |
| 3,706,393 A | 12/1972 | Curtis et al. |
| 3,726,442 A | 4/1973 | Davidson et al. |
| 3,795,350 A | 3/1974 | Shay |
| 3,796,356 A | 3/1974 | Venus, Jr. |
| 3,918,615 A | 11/1975 | Morane |
| 3,931,831 A | 1/1976 | French |
| 3,961,725 A | 6/1976 | Clark |
| 3,991,916 A * | 11/1976 | Del Bon ................. 222/402.13 |
| 4,035,303 A | 7/1977 | Ufferfilge |
| 4,099,651 A | 7/1978 | Von Winckelmann |
| 4,222,501 A | 9/1980 | Hammett et al. |
| 4,304,749 A | 12/1981 | Bauer |
| 4,352,443 A | 10/1982 | Libit |
| 4,387,833 A | 6/1983 | Venus, Jr. |
| 4,393,984 A | 7/1983 | Debard |
| 4,416,602 A | 11/1983 | Neumeister |
| 4,423,829 A | 1/1984 | Katz |
| 4,458,832 A | 7/1984 | Corsette |
| 4,493,444 A | 1/1985 | Del Bon et al. |
| 4,506,808 A | 3/1985 | Goncalves |
| 4,513,890 A | 4/1985 | Goncalves |
| 4,564,130 A | 1/1986 | Eulenburg |
| 4,830,229 A | 5/1989 | Ball |
| 4,867,347 A | 9/1989 | Wass et al. |
| 4,875,604 A | 10/1989 | Czech |
| 4,892,231 A | 1/1990 | Ball |
| 4,919,312 A | 4/1990 | Beard et al. |
| 4,946,076 A | 8/1990 | Hackmann et al. |
| 4,964,852 A | 10/1990 | Dunning et al. |
| 4,969,577 A | 11/1990 | Werding |
| 5,007,556 A | 4/1991 | Lover |
| 5,007,596 A | 4/1991 | Iwahashi |
| 5,096,098 A | 3/1992 | Garcia |
| 5,139,201 A | 8/1992 | De Laforcade |
| 5,197,637 A | 3/1993 | Naumann |
| 5,221,724 A | 6/1993 | Li et al. |
| 5,244,128 A | 9/1993 | De Laforcade |
| 5,271,432 A | 12/1993 | Gueret |
| 5,273,191 A | 12/1993 | Meshberg |
| 5,301,850 A | 4/1994 | Gueret |
| 5,305,930 A | 4/1994 | De Laforcade |
| 5,340,031 A | 8/1994 | Neuhaus et al. |
| 5,360,145 A | 11/1994 | Gueret |
| 5,413,250 A | 5/1995 | Gueret |
| 5,454,488 A | 10/1995 | Geier |
| 5,465,872 A | 11/1995 | Gueret |
| 5,492,252 A | 2/1996 | Gueret |
| 5,505,341 A | 4/1996 | Gueret |
| 5,509,582 A | 4/1996 | Robbins, III |
| 5,588,565 A * | 12/1996 | Miller ........................ 222/394 |
| 5,622,284 A | 4/1997 | Sawicki |
| 5,649,645 A | 7/1997 | Demarest et al. |
| 5,687,884 A | 11/1997 | Bodin et al. |
| 5,728,333 A | 3/1998 | Tabata et al. |
| 5,732,855 A | 3/1998 | Van der Heijden |
| 5,743,441 A | 4/1998 | Baudin et al. |
| 5,769,283 A | 6/1998 | Owada et al. |
| 5,857,224 A | 1/1999 | Oberg et al. |
| 5,862,955 A | 1/1999 | Albini et al. |
| 5,868,287 A | 2/1999 | Kurolkawa et al. |
| 5,873,491 A | 2/1999 | Garcia et al. |
| 5,875,936 A | 3/1999 | Turbett et al. |
| 5,875,939 A | 3/1999 | Geier |
| 5,881,929 A | 3/1999 | Coerver, Jr. |
| 5,927,568 A | 7/1999 | De Nervo et al. |
| 5,975,381 A | 11/1999 | Revenu |
| 6,007,914 A | 12/1999 | Joseph et al. |
| 6,083,450 A | 7/2000 | Safian |
| 6,112,953 A | 9/2000 | Gueret |
| 6,116,475 A | 9/2000 | Delage |
| 6,126,044 A | 10/2000 | Smith |
| 6,145,707 A | 11/2000 | Baudin |
| 6,216,916 B1 | 4/2001 | Maddox et al. |
| 6,227,417 B1 | 5/2001 | De LaForcade et al. |
| 6,234,363 B1 | 5/2001 | Stradella |
| 6,298,960 B1 | 10/2001 | Derr |
| 6,322,542 B1 | 11/2001 | Nilson et al. |
| 6,328,920 B1 | 12/2001 | Uchiyama et al. |
| 6,352,184 B1 | 3/2002 | Stern et al. |
| 6,382,469 B1 | 5/2002 | Carter et al. |
| 6,405,898 B1 | 6/2002 | O'Connor et al. |
| 6,589,216 B1 | 7/2003 | Abbott et al. |
| 6,622,893 B2 | 9/2003 | Leone et al. |
| 6,629,799 B2 | 10/2003 | Flores, Jr. |
| 6,756,004 B2 | 6/2004 | Davis et al. |
| 6,778,089 B2 | 8/2004 | Yoakum |
| 6,832,704 B2 | 12/2004 | Smith |
| 6,919,114 B1 | 7/2005 | Darras et al. |
| 6,966,465 B2 | 11/2005 | Kang |
| 7,040,514 B2 | 5/2006 | Colan et al. |
| 7,104,424 B2 | 9/2006 | Kolanus |
| 7,264,142 B2 | 9/2007 | Py |
| 7,464,839 B2 | 12/2008 | Heukamp |
| 7,523,845 B2 | 4/2009 | Eberhardt |
| 7,637,399 B2 * | 12/2009 | Marroncles et al. ..... 222/402.13 |
| 7,748,647 B2 | 7/2010 | Clerget et al. |
| 7,780,045 B2 | 8/2010 | Rossignol |
| 7,854,355 B2 | 12/2010 | Rossignol |
| 7,934,667 B2 | 5/2011 | Westrich |
| 8,109,412 B2 * | 2/2012 | Decottignies et al. ........ 222/108 |
| 8,602,266 B2 * | 12/2013 | Canfield et al. ............... 222/207 |
| 2002/0037179 A1 | 3/2002 | Suzuki et al. |
| 2002/0051314 A1 | 5/2002 | Hayashi |
| 2002/0074355 A1 | 6/2002 | Lewis et al. |
| 2002/0190085 A1 | 12/2002 | Stanford |
| 2003/0071080 A1 | 4/2003 | Yquel |
| 2003/0071085 A1 | 4/2003 | Lasserre et al. |
| 2003/0230603 A1 | 12/2003 | Smith |

(56) References Cited

U.S. PATENT DOCUMENTS

| | | |
|---|---|---|
| 2005/0098584 A1 | 5/2005 | Do Rosario |
| 2005/0115984 A1 | 6/2005 | Pritchett et al. |
| 2005/0155980 A1 | 7/2005 | Neuhalfen |
| 2006/0060618 A1 | 3/2006 | Hoepner et al. |
| 2006/0186139 A1* | 8/2006 | Laidler et al. ............ 222/207 |
| 2006/0231519 A1 | 10/2006 | Py et al. |
| 2007/0228082 A1 | 10/2007 | Jasper et al. |
| 2007/0272767 A1 | 11/2007 | Niggemann |
| 2008/0099514 A1* | 5/2008 | Carter et al. ............ 222/472 |
| 2008/0110941 A1 | 5/2008 | Foster et al. |
| 2008/0197152 A1 | 8/2008 | Neuhaus et al. |
| 2009/0166383 A1 | 7/2009 | Canfield |
| 2009/0212075 A1 | 8/2009 | Neuhaus et al. |
| 2009/0236373 A1 | 9/2009 | Laib et al. |
| 2009/0294480 A1 | 12/2009 | Canfield |
| 2009/0314810 A1 | 12/2009 | Neuhaus |
| 2010/0012680 A1 | 1/2010 | Canfield et al. |
| 2010/0038385 A1 | 2/2010 | Jasper |
| 2010/0108722 A1 | 5/2010 | Canfield et al. |
| 2010/0147898 A1 | 6/2010 | Blumenstein et al. |
| 2010/0200616 A1* | 8/2010 | Decottignies ............ 222/207 |
| 2011/0309112 A1 | 12/2011 | Jordan |
| 2012/0111898 A1 | 5/2012 | Neuhaus |
| 2013/0056500 A1* | 3/2013 | Neuhaus ............ 222/402.13 |

FOREIGN PATENT DOCUMENTS

| | | |
|---|---|---|
| DE | 9307083 | 7/1993 |
| DE | 4210225 | 9/1993 |
| DE | 19851659 A1 | 11/1998 |
| DE | 29820894 U1 | 11/1998 |
| DE | 19744510 A1 | 4/1999 |
| DE | 19832824 | 2/2000 |
| DE | 19950512 | 5/2001 |
| DE | 20203841 | 6/2002 |
| DE | 10308727 | 6/2004 |
| DE | 202004011220 U1 | 11/2004 |
| DE | 202004011219 | 11/2004 |
| DE | 202005012684 | 11/2005 |
| DE | 10 2007 049614 | 9/2008 |
| EP | 0058700 | 9/1982 |
| EP | 0069738 | 1/1983 |
| EP | 0179538 | 4/1986 |
| EP | 0320510 | 6/1989 |
| EP | 0599301 | 6/1994 |
| EP | 0442858 B1 | 7/1994 |
| EP | 0864371 | 9/1998 |
| EP | 0893356 | 1/1999 |
| EP | 0908395 | 4/1999 |
| EP | 0930102 A | 7/1999 |
| EP | 1084669 | 3/2001 |
| EP | 0954485 | 1/2002 |
| EP | 1327478 | 7/2003 |
| EP | 1637232 A | 3/2006 |
| FR | 1266391 | 7/1961 |
| FR | 2127774 | 10/1972 |
| FR | 2510069 | 1/1983 |
| FR | 2654079 A | 11/1989 |
| FR | 2783667 | 3/2000 |
| FR | 2838108 | 10/2003 |
| GB | 1405546 | 8/1972 |
| GB | 1523732 | 9/1978 |
| GB | 2083142 | 3/1982 |
| GB | 2105729 | 3/1983 |
| GB | 2150226 | 6/1985 |
| GB | 2155435 | 9/1985 |
| GB | 2161222 | 1/1986 |
| JP | 07251884 | 3/1995 |
| JP | 09039467 | 2/1997 |
| WO | WO 96/16746 | 6/1996 |
| WO | WO 00/26007 | 5/2000 |
| WO | WO 00/44505 | 8/2000 |
| WO | WO 01/25116 A1 | 4/2001 |
| WO | WO 02/79679 A | 3/2002 |
| WO | WO 02/48004 | 6/2002 |
| WO | WO 2004/022143 | 3/2004 |
| WO | WO 2004/073871 | 9/2004 |
| WO | WO 2004/073877 | 9/2004 |
| WO | WO 2005/000731 | 1/2005 |
| WO | WO 2005/123542 | 12/2005 |
| WO | WO 2005/123543 | 12/2005 |
| WO | WO 2006/123168 | 11/2006 |
| WO | WO 2006/128574 A1 | 12/2006 |
| WO | WO 2007/062824 | 6/2007 |
| WO | WO 2007/104561 | 9/2007 |
| WO | WO 2009/030393 | 3/2009 |

OTHER PUBLICATIONS

International Search Report issued by the European Patent Office on Oct. 2, 2008, for International Application No. PCT/EP2008/002117.
International Preliminary Report on Patentability issued by the European Patent Office on Oct. 6, 2009, for International Application No. PCT/EP2008/002117.
Written Opinion issued by the European Patent Office on Oct. 2, 2008, for International Application No. PCT/EP2008/002117.
U.S. Appl. No. 12/303,807, filed Apr. 1, 2010, Neuhaus et al.
U.S. Appl. No. 12/600,219, filed Mar. 13, 2010, Canfield et al.
U.S. Appl. No. 12/675,204, filed Apr. 29, 2010, Sonntag.
U.S. Appl. No. 12/675,229, filed Apr. 27, 2010, Bernhard.
Wacker Silicones, Geniomer® 200 Thermoplastic Silicone Elastomer, Jan. 10, 2005, XP002394023, retrieved from Internet address http://www.wacker.com/internet/webcache/en__US?PTM?TM?GENIOMER/GENIOMER__200__e.pdf on Aug. 8, 2006.
U.S. Appl. No. 13/663,009, filed Oct. 29, 2012, Neuhaus.

\* cited by examiner

DISPENSING DEVICE

CROSS REFERENCE TO RELATED APPLICATIONS

This application is a national stage application under 35 U.S.C. 371 of PCT Application No. PCT/EP2008/002117 having an international filing date of 17 Mar. 2008, which designated the United States, which PCT application claimed the benefit of German Application Nos. 102007013130.7 filed 15 Mar. 2007, and 102007049614.3 filed 17 Oct. 2007, the entire disclosure of each of which are hereby incorporated herein by reference.

The invention relates to a dispensing device for a preferably cosmetic liquid as set forth herein.

In the present invention, the term "dispensing device" is to be particularly understood as a dispensing head which is preferably mounted or mountable particularly on a container or the dispensing valve thereof or on a hand-operated pump. In particular, it can also be a pressurized container, a dispensing pump or the like. The dispensing device is preferably used for the non-spraying delivery or dispensing of a preferably cosmetic liquid. However, it can also be a dosing pump or hand-operated pump or any other dispensing device such as a container, dispensing or spray head, dispenser or the like, particularly for a cosmetic liquid.

The term "cosmetic liquid" is to be understood, in a narrower sense, as cosmetics, hair spray, hair lacquer, a deodorant, a foam, particularly shaving foam, a gel, a color spray, a sun protection or skin care agent or the like. Preferably, however, in a broader sense, other body care products, cleaning products or the like, and even suspensions and fluids, particularly those with gas phases, are included as well. Moreover, other liquids, for example air improvers and particularly technical liquids and fluids as well such as rust removers and the like, can also be used. Nonetheless, for the sake of simplicity and due to the emphasized use, there is often only mention of cosmetic liquid in the following.

In today's dispensing devices for the dispensing of particularly foaming or foamed liquids, such as shaving foam, or in dispensing pumps, there is often the problem that the liquids or products formed from them come out after the actual dispensing is finished, in particular foaming or dripping out subsequently. This problem is particularly striking in shaving foam or the like but also occurs in non-foamed or non-foaming liquids and can lead, in particular, to undesired contaminations of the dispensing devices.

EP 0 442 858 B1 discloses a dispensing device with a lower part and an elastic upper part. Formed between the upper part and the lower part are a pump chamber and an outlet valve opening as a result of the liquid pressure. By depressing the upper part, a liquid can be forced from the pump chamber and can be dispensed via the outlet valve. Subsequently, an automatic, elastic closing of the outlet valve and returning to position of the upper part occurs, with new liquid being sucked into the pump chamber. It is difficult to tightly connect the upper part with the lower part and to find a suitable material for the upper part in order to achieve the desired characteristics—particularly, high chemical resistance and high restorative forces.

WO 01/025116 A1, which forms the starting point of the present invention, discloses a dispensing head for a pressurized container. Upon actuation of the dispensing head, a dispensing valve of the container is opened in order to deliver a foam or a gel via an outlet channel formed in the dispensing head. The outlet channel is provided on its outlet side with an outlet valve in order to prevent subsequent foaming or dripping after actuation of the dispensing head. The outlet valve is particularly embodied as a self-closing slit valve. In practice, it has been shown that such a valve does not close satisfactorily. What is more, the dispensing head is difficult to manufacture, since the outlet valve is manufactured as a separate part and must be subsequently installed in a leak-proof manner.

It is the object of the present invention to provide an improved dispensing device whereby an improved valve construction is made possible with a simple, cost-effective construction.

The abovementioned object is achieved by a dispensing device as set forth herein One aspect of the present invention consists in that the valve element of a valve, particularly of an outlet valve, is injected onto a wall and/or lies thereon with its entire surface or flat surface. The opening of the valve then occurs particularly through a lifting of the valve element away from the wall in areas. In this way, a very simple valve construction is made possible with especially good closing characteristics.

Alternatively or in addition, the valve element covers an outlet opening formed in the wall or in a component on the flat side. This also permits an especially simple valve construction that closes well.

Another aspect of the present invention which can also be implemented independently consists in that the dispensing device has a stop which presses or pretensions the valve element into the closed position when the valve is closed. As a result, a particularly good closing of the valve is ensured with a simple valve construction.

Especially preferred is a combination of the stop with the aforementioned embodiment of the valve element and/or with a valve element which can be elastically deformed to open the valve and the elastic restorative forces of which act in the closing direction in order to achieve an especially tight or securely closing valve and/or to prevent or minimize a product from subsequently coming out after actuation is completed.

Another aspect of the present invention consists in enabling the joining of two materials, particularly of the same or different plastics, by pretreating a material or the surface thereof such that the other material can be injected particularly directly against the first material and thus connected therewith. Especially preferably, no other measures, processing, adhesion promoters or the like are then necessary. The pretreatment is particularly performed by means of plasma treatment and/or irradiation.

After the pretreatment, the other or second material can be preferably molded through so-called "bi-injection" (i.e. in the injection mold in which the first material was previously poured or injected) directly against the pretreated or first material and solidly connected therewith as a result. In the present invention, solid connection or connection is to be preferably understood as a chemical and/or [sic] connection.

Preferably, the pretreatment is only performed in areas or only in a desired area. This area can be established very easily and inexpensively during this pretreatment by means of a mask, screen or the like. A joining or adhesion of the two materials, particularly of the second material on the first material, then occurs particularly only in the pretreated area. Accordingly, it is possible, for example, to inject the second material against the first material over the entire surface but to achieve a joining with the first material only in the pretreated partial area. In the other area, the second material or the component or the like formed by it—depending on the requirement, construction, or the like—is able to detach again and, for example, form a chamber in contact with the liquid, a pump chamber or, especially preferably, a valve or an outlet channel or the like which closes again, for example.

Other advantages, features, characteristics and aspects of the present invention follow from the claims and the following description of preferred embodiments on the basis of the drawing.

In the partially not true-to-scale, only schematic figures, the same reference symbols are used for same or similar parts, with corresponding or comparable characteristics and advantages being achieved even if a repeated description is omitted.

FIG. 1 shows, in schematic section, a first embodiment of the proposed dispensing device 1 which is preferably embodied as a dispensing head for dispensing a liquid 2 in the sense named at the outset.

Figure 1:
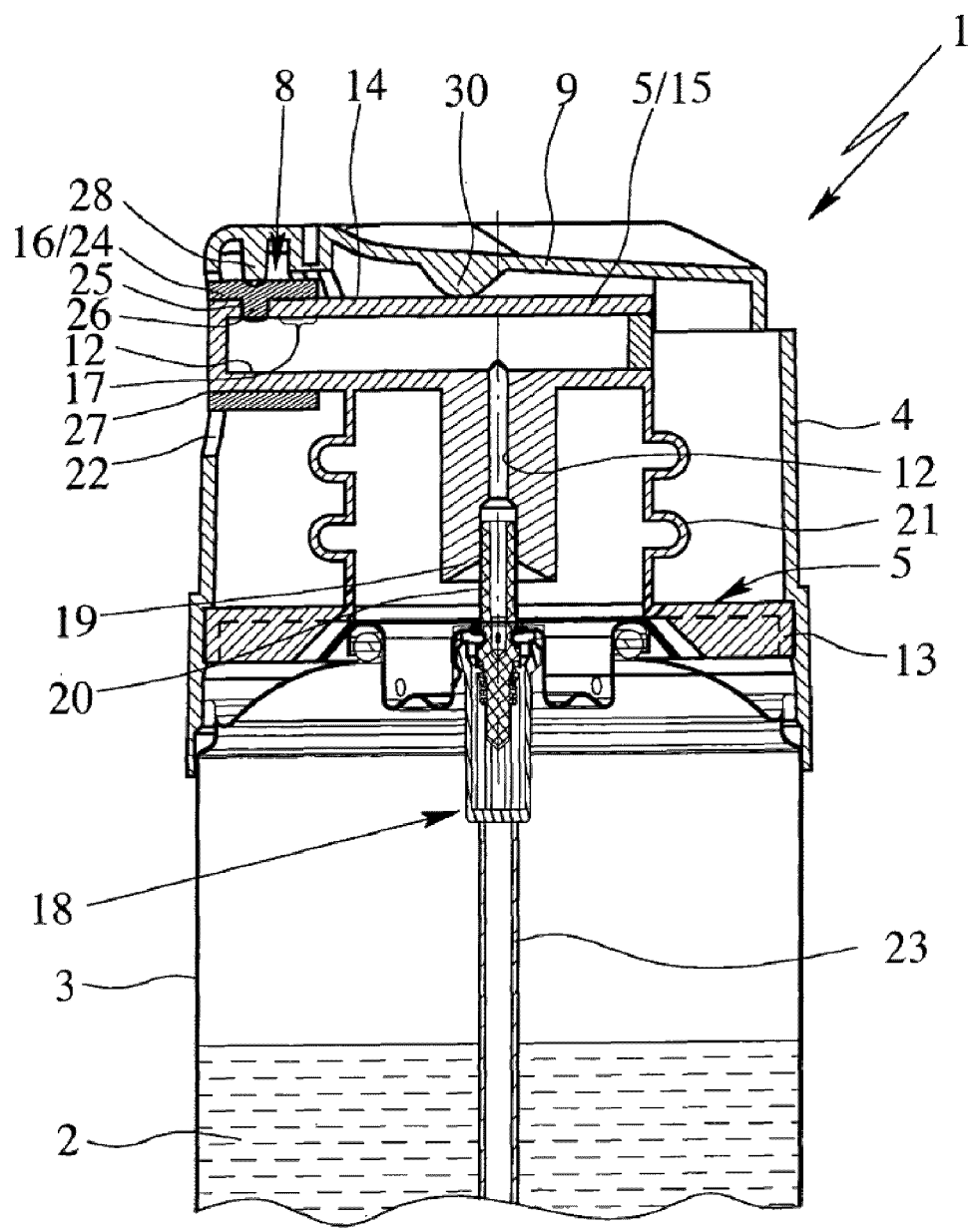
FIG. 1 shows a schematic section of a proposed dispensing device according to a first embodiment.

The liquid 2 can be substantially more viscous than water or, if desired, even pasty. Particularly, it can form a foam or gel. The liquid 2 can also contain gas in liquid and/or another form.

Particularly, the dispensing device 1 is designed for the non-spraying dispensing of the liquid 2. In particular, the dispensing of the liquid 2 occurs as foam, preferably as shaving foam or the like. To this end, the liquid 2 is designed to be self-foaming and/or to foam up upon dispensing.

In principle, however, the liquid 2 can be dispensed in a non-foamed state and even be particularly designed to be non-foaming. Moreover, it is possible for the liquid 2 to only foam up very slightly, so that the foaming only enlarges the volume a bit, for example, but so that a substantially liquid or pasty consistency is maintained during dispensing.

It should be noted that, instead of the dispensing of the liquid 2 as a foam explained for the sake of example, any other dispensing of the liquid 2—as needed, even as a pasty mass, as gel, as drops, as a stream or as a spray mist—is also possible in principle.

The dispensing device 1 is preferably provided or connected with a reservoir, particularly a container 3, for the liquid 2 to be dispensed. The reservoir can therefore form part of the dispensing device 1 or can be connected thereto.

In the depicted example, the reservoir is embodied as a preferably rigid container 3, particularly as a pressurized container. The container 3 is particularly designed to be oblong and/or cylindrical and/or rigid—especially preferably as a metallic can—for the liquid 2.

The liquid 2 in the reservoir can either be put under pressure or is under pressure. In particular, the container 3 or the liquid 2 contains a suitable propellant, preferably a volatile and/or flammable propellant, compressed gas and/or carbon dioxide.

The container 3 has, especially preferably, a dispensing valve 18 on its front side to which the dispensing device 1 or the dispensing head formed from it is or can be connected.

The dispensing device 1 has a dispensing channel 12 with an associated outlet valve 8. Especially preferably, the outlet valve 8 is arranged at the dispensing end 27 of the dispensing channel 12 or of the dispensing device 1.

In the depicted example, the dispensing device 1 preferably has a housing part 4 which is connected or connectable with the reservoir or container 3 and which can be placed thereon especially preferably in a clamping and/or locking manner.

Moreover, the dispensing device 1 has a component 5 preferably inserted into the housing part 4 and/or held by same which forms the dispensing channel 12 and can be connected to the dispensing valve 18. In the depicted example, the component 5 is provided with a connecting section 19 for particularly pluggable connection with the dispensing valve 18 or a connection element 20 of the dispensing valve 18.

In the depicted example, the two parts 4, 5 are embodied as separate parts. In particular, the component 5 is inserted into or engaged or otherwise connected with the housing part 4, particularly by means of a connecting part 13. However, the two components 4, 5 can also be embodied as a single piece, for example.

Especially preferably, no nozzle, no other channel or the like is connected to the outlet valve 8 or the valve element 24 thereof of a dispensing end 27 or the dispensing channel 12. Rather, these preferably lead "into the open." Accordingly, after exiting the dispensing channel 12 or outlet valve 8, the liquid 2 is able to be removed preferably directly and used by a user, not shown.

The outlet valve 8 is preferably embodied such that it opens depending on the existing liquid pressure, particularly when a predetermined minimum pressure is exceeded. Especially preferably, this minimum pressure is greater than the foaming pressure of the preferably self-foaming liquid 2. By contrast, the dispensing pressure (with opened dispensing valve 18) and hence the existing liquid pressure is then greater, in turn, than the minimum pressure, so that the outlet valve 8 also opens for the desired dispensing of liquid and generation or dispensing of foam.

In addition, the dispensing device 1 preferably has an actuation element 9 which is formed in the depicted example by the housing part 4 or is molded thereon but can also be embodied as a separate part. However, other constructive solutions are also possible.

The opening of the dispensing valve 18 occurs preferably by depressing and/or tilting the dispensing device 1 or the component 5 or the actuation element 9. For example, the actuation element 9 can act on the component for this purpose by means of an actuating section 30.

The component 5 has, for example, a springy, flexible area or section 21, so that the component 5 can be displaced with its connecting section 19 toward the dispensing valve 18, thus making it possible for the dispensing valve 18 to open.

In the depicted example according to FIG. 1, the springy section 21 is especially preferably embodied in the manner of a bellows and/or is preferably only springy and elastic in a translational direction, particularly the direction of actuation of the dispensing valve 18. However, other constructive solutions are also possible; for example, the dispensing channel 12 or the component 5 can also be alternatively or additionally tiltable or rotatable in order to open the dispensing valve 18.

In the depicted example, the return to position of the component 5 occurs preferably exclusively as a result of the spring forces of the springy section 21. Additionally or alternatively, however, a return or closing spring (not shown) or another constructive solution can also be used.

In the depicted example, the actuation element 9 can preferably be swiveled or tilted in order to open the dispensing valve 18 by way of the component 5, which can be moved here preferably only translationally, or a depressing of the connecting section 19.

Preferably, the dispensing channel 12, the connecting section 19 and/or the outlet valve 8 can also be displaced, particularly depressed, with the component 5. In the depicted example, the housing part 4 has a corresponding through hole 22 of the outer wall in order to enable the abovementioned, preferably likewise translational, movement of the dispensing end 27. However, other constructive solutions are also possible here.

When the dispensing valve 18 is open, the liquid 2 in the reservoir or container 3, which is preferably under pressure, is able to flow via a riser tube 23 and the open dispensing valve 18 into the dispensing channel 12. Particularly, an at least initial foaming of the liquid 2 then occurs in the dispensing channel 12. As needed, a foam formation device (not shown) can also be provided (additionally or alternatively) for this purpose. For example, the liquid 2 or the foam can be fed through a screen (not shown) and/or be foamed up (additionally or alternatively) through the addition of gas or air.

As a result of the liquid pressure or dispensing pressure prevailing or pending in the dispensing channel 12 when the dispensing valve 18 is open, the outlet valve 8 opens preferably automatically.

The liquid 2 can then escape through the open outlet valve 8 toward the outside or into the open and, especially preferably, foam up or foam up further or form a gel or another product or be dispensed in liquid, pasty or another form.

The dispensing valve 18 preferably closes again automatically upon release. However, the dispensing valve 18 can also be a dosing valve or other valve device, for example.

The dispensing of liquid or generation of foam ends when the liquid pressure or dispensing pressure prevailing in the dispensing channel 12 falls again below the minimum pressure, so that the outlet valve 8 closes. This is the case when the dispensing valve 18 closes again, particularly through release or automatic return to position of the dispensing head or actuation element 9. The closed or closing outlet valve 8 then prevents liquid 2 or foam or the like still in the dispensing channel 12 to come or foam out subsequently in an undesired manner.

The outlet valve 8 preferably has a component 24 which is preferably designed to be movable at least in part or in areas and/or particularly forms a valve element. In particular, the valve element 24 can seal off an outlet opening 25 of the dispensing channel 12.

The outlet opening 25 preferably ends in a surface or wall 14 of the component 5 or dispensing channel 12 which is or can be covered by the valve element 24 at least in the area of the outlet opening 25.

In the depicted example, the surface or wall 14 is preferably arched or curved or convex. Especially preferably, this is an annular surface. Accordingly, the component 5 or the dispensing channel 12 is preferably cylindrically hollow or cylindrical or annular at least in the area of the outlet opening 25.

The valve element 24 is preferably adapted to the curvature of the surface and surrounds the dispensing channel 12 or the component 5 or the surface in the area of the outlet opening 25 preferably in part and particularly completely, in the manner of a ring in the depicted example. However, other constructive solutions are also possible here.

The component 5 is manufactured here from a first material 15, particularly a relatively rigid plastic material.

The component 5 is preferably injection molded. The first material 15 is preferably a plastic, particularly an elastomer and/or thermoplast. In principle, however, it can be another material as well. This is especially the case if the component 5 does not form (only) the wall 14 but rather another component of the dispensing device 1.

The first material 15 is preferably a thermoplast, elastomer, rubber or other plastic. Preferably, TPE (thermoplastic elastomer), TPV, TEEE (thermoplastic elastomers with ether and ester groups), and especially preferably TPU (thermoplastic urethane) is also used.

According to the proposal, the component 5 is particularly provided or covered in areas, namely in the area of the wall 14, with the valve element 24 or another component or second material 16.

The second material 16 is preferably also an elastomer and/or a thermoplast, but can also be another material if need be. Especially preferably, the second material 16 is a plastic which is food-safe and/or insensitive or resistant to the liquid 2, such as a polyolefin, particularly PP (polypropylene) or PE (polyethylene), especially preferably UPE, TPEE, TEEE or even TPU.

The first material 15 and the second material 16 are preferably different, which is to say they have different characteristics and/or at least different compositions. Through the combination of different materials, the desired characteristics of the component 5, for example in the area of the wall 14 or in the area that can be elastically deformed for pumping, can be achieved much more easily.

The second material 16 or the layer or preferably joined with the first material 15 in a solid, undetachable and/or full-surface manner. For this purpose, the second material 16 is particularly injected using so-called "bi-injection" onto the first material 15, and the first material can have or form in part an at least substantially smooth or rough surface or a surface provided with undercuts, recesses, through holes or the like.

The first material 15 or the surface thereof is preferably pretreated at least in areas prior to the injection of the second material 16. Particularly, a pretreatment is performed by means of plasma treatment and/or irradiation. As a result of the pretreatment, radicals are able to be formed and/or polymer chains broken up and/or a better bond or a bond at all is made possible between the first material 15 and the second material 16.

When the second material 16 is injected on, against or on top of the first material 15 with the pretreated surface, the second material 16 is able to bond with the first material 15 particularly chemically and/or solidly and/or tightly and/or undetachably—particularly only in the pretreated area 17.

During the "bi-injection," the injection of the second material 16 occurs particularly in the same injection mold in which the component 5 or the wall is produced. In particular, a removal of the component 5 is not necessary. This allows for particularly simple manufacture.

Alternatively or in addition, the second material 16 can in principle also be joined through adhesion, welding or in another suitable manner, particularly by means of a positive and/or nonpositive connection, for example through clamping, with the component 5 or the wall 14.

Alternatively, the second material 16 or the material layer can also be joined with the first material 15 only in areas or be held together with this, for example in edge or circumferential areas.

Alternatively or in addition to the preferred chemical connection of the two materials 15, 16 through pretreatment and subsequent injection—particularly after previous pretreatment—a mechanical, particularly a nonpositive or positive connection is also possible.

The valve element is produced from the second material 16, which is preferably elastically deformable and particularly softer than the first material 15.

The valve element 24 is preferably injection molded, particularly through "bi-injection," directly onto or against the component 5. This allows for very simple manufacture.

The valve element 24 can protrude with a projection 26 into the outlet opening 25 as shown in the depicted example. The projection 26 is particularly very simple to manufacture and to mold using the preferred injection of the component 24.

Under appropriate liquid pressure, the outlet valve 8 opens as a result of the valve element 24 lifting or widening or expanding radially at least in part from the component 5. Accordingly, especially the optional projection 26 is then also able to be displaced radially outward at least somewhat in order to thus enable the flowing out of the liquid 2 from the dispensing channel 12 through the outlet opening 25 and then axially frontward toward the free end of the component 5 or dispensing end 27.

Especially preferably, the valve element is joined solidly and/or tightly at least in areas with the surface of the component 5 or the first material 15 at least in areas. The connection is made possible particularly through a pretreatment of the surface or wall 14 in the area 17 in which a solid connection is desired prior to the injection of the second material 16. Especially preferably, the pretreatment is performed by means of plasma treatment and/or irradiation. In this manner, the two materials 15 and 16, such as PE or PP on the one hand [and] TPU on the other hand, which cannot be otherwise joined solidly together through injection, are able to be joined together in the desired area through the subsequent injection of the second material 16 in a solid, particularly chemical and/or tight manner.

As already mentioned, one aspect consists of pretreating a material or the surface thereof to improve the bondability of two materials, particularly plastics, through plasma treatment and/or irradiation, for example by means of electrons, positrons, microwaves, UV radiation, X-ray radiation, laser light or the like in order to enable an especially good adhesion or an adhesion at all of the second material on the first, pretreated material. Especially preferably, no other adhesion promoter or the like is then necessary. In particular, even materials which cannot normally be joined together, such as TPU on the one hand and PE or PP on the other hand, can be joined together. Particularly, this makes it possible to inject the other material directly against the pretreated material, particularly by means of aforementioned "bi-injection" or the like in order to directly achieve a solid bond using the two materials.

In particular, the aforementioned pretreatment can also [be used] in any embodiment to produce a good or solid or exclusive connection between the materials 15, 16 and component[s] 5, 24, respectively.

According to an especially preferred variation, the pretreatment is only performed in a limited area 17. For example, the area 17 can be established by a screen, mask or the like, so that the desired plasma treatment, irradiation or the like for the pretreatment occurs only in the desired area 17.

In particular, it is possible and a provision is made to inject or otherwise apply the second material 16 directly and with its entire surface against the first material 15 or the surface or wall 14 formed by it. As a result of the pretreatment only in areas, an adhesion or bond then preferably only occurs in the pretreated area 17. The other component or valve element 24 is then therefore again able to detach, for example lift off or the like, from the first material 15 in the untreated area 17, particularly in order to form a channel for the liquid 2 or a product formed from it such as a foam, or a valve, an outlet channel or the like. Very simple manufacture and the easy establishment of desired areas of connection 17 are made possible in this way.

According to a preferred embodiment, the connection area 17 in which the aforementioned pretreatment or solid connection of the valve element 24 with the component 5 occurs is preferably annular and/or arranged only on the side of the outlet opening 25 opposite a dispensing end 27.

In principle, it should be noted that, in the present invention, the term "solid" connection is to be preferably understood in terms of a chemical and/or leak-proof connection.

Surprisingly, it has been shown and one aspect of the invention consists in that a more or less "virtual" outlet channel is formed between the two materials 15, 16 lying flat against each other or components 5, 24 lying flat against each other which opens only in the event of appropriate liquid pressure and closes again automatically and particularly performs a valve function and/or is able to very effectively prevent undesired subsequent flowing or foaming.

According to an embodiment which is not shown, the connection area 17 can also extend laterally next to the outlet opening 25 or axially toward the dispensing end 27 and particularly surround the outlet opening 25 in a U-shape, with the open end then ending at the dispensing end 27. In this manner, the "virtual" outlet channel can be limited particularly as needed on the longitudinal side or—to put it in another way—an especially defined dispensing behavior in a correspondingly limited circumferential area or surface area between the component 5 and valve element 24 can be ensured.

According to another aspect, the outlet valve 8 or the valve element 24 thereof is (additionally) pressed or pretensioned by a stop 28 into the closed position—here particularly against the outlet opening 25—when the dispensing device 1 is not actuated or the dispensing valve 18 is closed. In the depicted example, the stop 28 is preferably arranged, particularly molded, on the housing side or on the housing part 4 and/or designed to be fixed or stationary.

In the depicted closed state, the component 5 or the dispensing channel 12 is located in the upper position, so that the stop 28 presses directly on the valve element 24 and/or on the side opposite the outlet opening 25, thus holding the outlet valve 8 (additionally) closed.

A special advantage of the outlet valve 8 consists in that, besides preventing the liquid 2 from subsequently coming out, particularly foaming out, very easy cleaning is also made possible for the user, since the outlet valve 8 preferably forms a neat and easy-to-clean dispensing end 27.

In the depicted example, the dispensing of liquid preferably occurs transversely, particularly perpendicularly, to the direction of depression or direction of opening of the dispensing valve 18 and/or at least substantially horizontally or transversely to the longitudinal direction of the container 3.

Preferably, the valve element 24 extends to the dispensing end 27 and/or forms same, particularly together with the component 5 or the wall 14.

Moreover, it should be mentioned that, preferably, no other device shaping the dispensing of liquid such as a nozzle, a channel or the like is connected to the dispensing end 27. However, this does not rule out the possibility of providing, for example, a bowl-like extension, recess in the housing or the like into which the dispensing end 27 empties.

Figure 2:
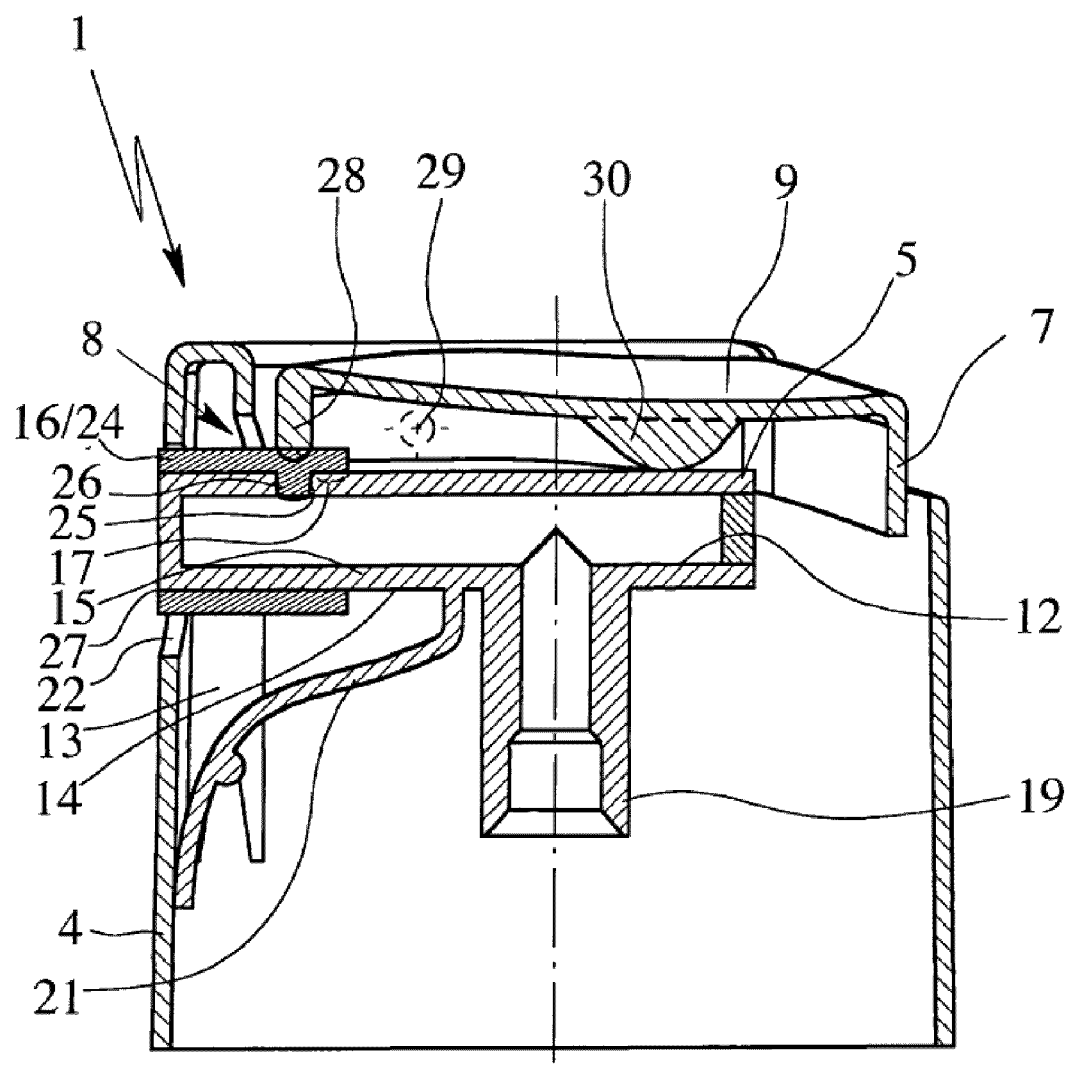
FIG. 2 shows a schematic section of a proposed dispensing device according to a second embodiment.

FIG. 2 shows a second embodiment of the proposed dispensing device 1, with the associated container 3 with the dispensing valve 18 not being depicted for the sake of simplification.

The second embodiment is very similar to the first embodiment, so that only substantial differences are explained in the following. Particularly, the previous descriptions and explanations for this and the other embodiments apply in addition or commensurately.

In the second embodiment, the component 5 with the dispensing channel 12 can be tilted or swiveled to actuate or open the dispensing valve 18 (not shown in FIG. 5) from the depicted initial position. In particular, the section 21 is not bellows-like as in the first embodiment, but rather shaped in the manner of an arm, for example, which is guided laterally to the housing part 4, for instance.

Upon depression or tilting, the component 5 is preferably able to move together with the actuation element 9 with one end or edge 7 into the housing part 4 or toward the dispensing valve 18 in order to open same.

In the second embodiment, the stop 28 is not stationary, but rather movable. Particularly, the stop 28 is mounted on the actuation element 9.

The actuation element 9 can be swiveled or tilted about a swivel axis 29 preferably running horizontally or, in the illustration according to FIG. 2, transversely to the drawing plane. The swivel axis 29 preferably lies on a plane between the stop 28 on the one hand and the actuating section 30 acting on the component 5 on the other hand. Accordingly, upon actuation or depression of the actuation element 9 from the position shown in FIG. 2, the actuating section 30 is moved downward and the stop 28 is moved upward or in the opposite direction. Accordingly, the outlet valve 8 is able to open unimpeded even if the component 5 or the outlet valve 8 cannot be moved downward away from the stop 28 or only relatively little when the dispensing device 1 is actuated.

Figure 3:
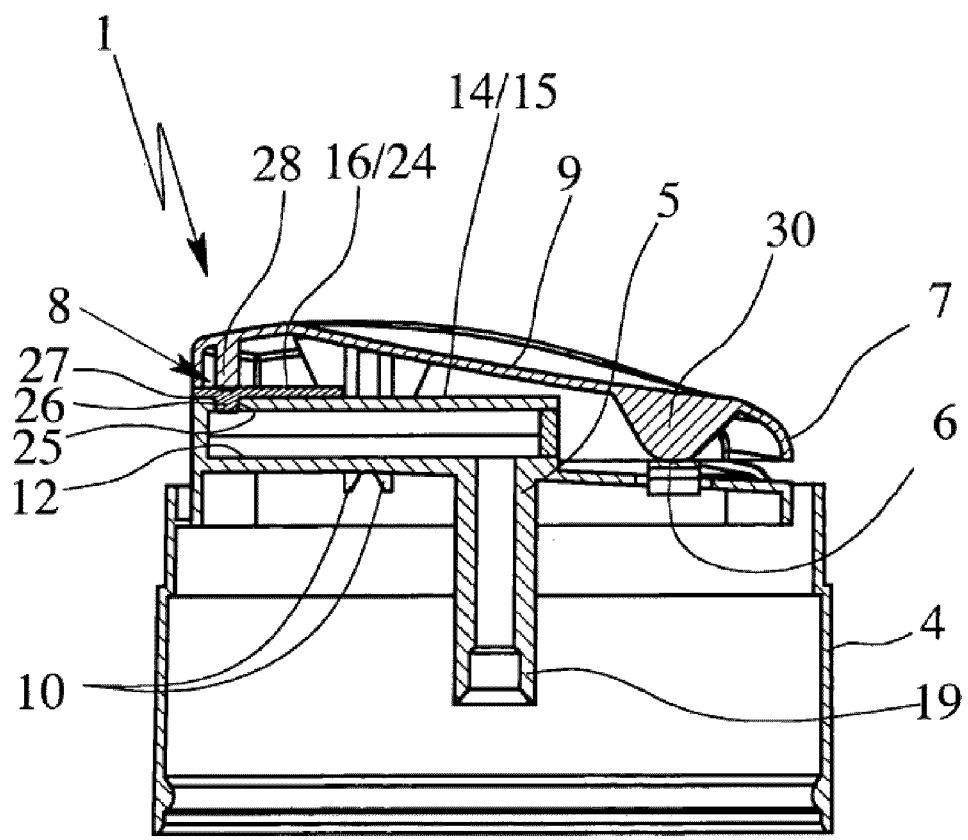
FIG. 3 shows a schematic section of a proposed dispensing device according to a third embodiment.
Figure 4:
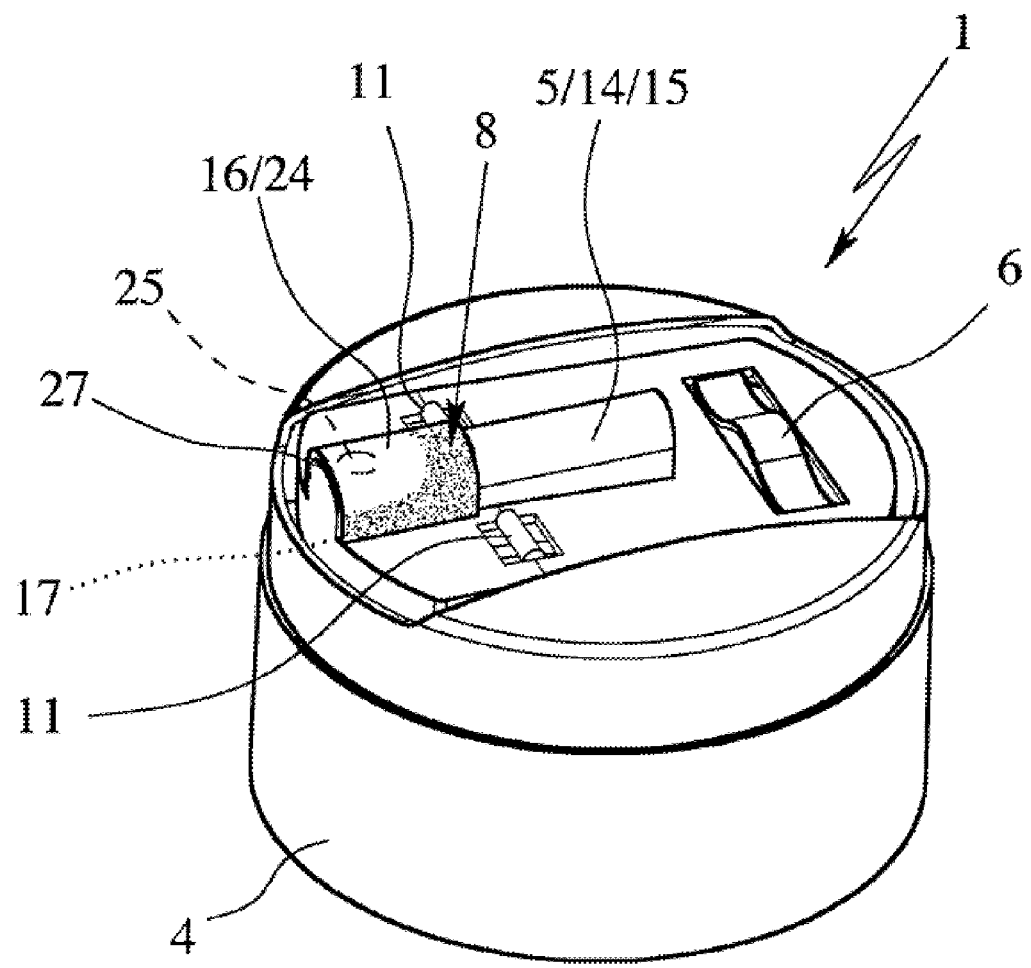
FIG. 4 shows a perspective view of the dispensing device according to FIG. 3.

In a schematic section, FIG. 3 shows a third embodiment which is very similar to the second embodiment. FIG. 4 shows a perspective view of the dispensing device 1 according to the third embodiment.

Here, the stop 28 is arranged in an at least for the most part stationary manner or is designed to be at least substantially immobile.

In the third embodiment, the component or valve element 24 is preferably not annular or hollow and cylindrical, but rather only arched or substantially semi-cylindrical. The component 24 is preferably joined at least in the area of its longitudinal edges solidly with the component 5, the wall 14 and/or the first material 15, preferably by means of a corresponding connection after corresponding pretreatment and/or in another suitable manner. Alternatively or in addition, the connection area 17 preferably extends over the wall 14 in the manner of a semi-ring on the side of the outlet opening 25 facing away from the dispensing end 27.

The connection of the component 5 and valve element 24 in the desired area 17 (indicated with dots in FIG. 4) is preferably performed, in turn, by means of appropriate pretreatment of the first material 15, particularly only in areas, and subsequent injection of the second material 16, so that a correspondingly solid connection between the two materials 15, 16 is produced in the pretreated area 17, as already discussed.

In principle, however, it is also possible to join the valve element 24 in any other suitable manner in the desired areas with the underlying surface or wall 14 or the component 5.

In the third embodiment, the housing part and the component 5 are preferably embodied in a single piece, with the housing part 4 holding the component 5 in a swiveling manner.

In the depicted example, the actuation element 9 is preferably embodied as a separate part which is particularly placed on, put on, clamped on or snapped on. In particular, the actuation element 9 is mounted or held here in a swiveling manner by means of preferably molded-on mounting sections 10 (FIG. 3) on the dispensing device 1 or on the component 5, particularly on retention sections 11 (FIG. 4). The swivel axis 29 (not shown here) runs particularly at least substantially horizontally. Preferably, the actuation element 9 is mounted or supported with its mounting sections 10 on both sides of the outlet valve 8 or valve element 24 and/or it can be or is snapped onto the retention sections 11.

However, other constructive solutions are also possible. Particularly, as a matter of principle, the actuation element 9 can also be otherwise mounted, elastically deformable and/or molded onto the housing part 4 or component 5.

Especially preferably, the stop 28 or the actuation element 9 is pretensioned into its initial position or the closing position closing the outlet valve 8. In the depicted example, a spring section 6 is provided for this purpose which is particularly molded in one piece with component 5 or formed by same. However, other constructive solutions are also possible.

The restorative force exerted on the actuation element 9 by the spring section 6 or another device is preferably lesser than the force required for the depression of the component 5 or connecting section 19 and particularly that required to open the dispensing valve 18. In this manner, it is possible for the stop 28 to first move away from the valve element 24 and for its force exerted on the valve element 24 to be reduced before the dispensing valve 18 opens.

Figure 5:
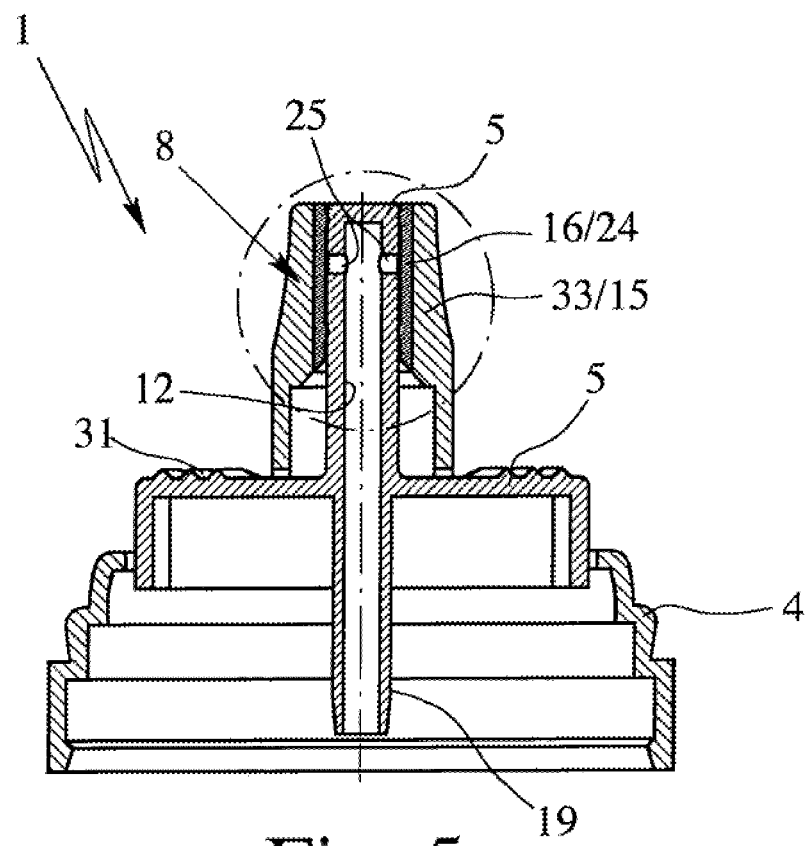
FIG. 5 shows a schematic section of a proposed dispensing device according to a fourth embodiment.
Figure 6:
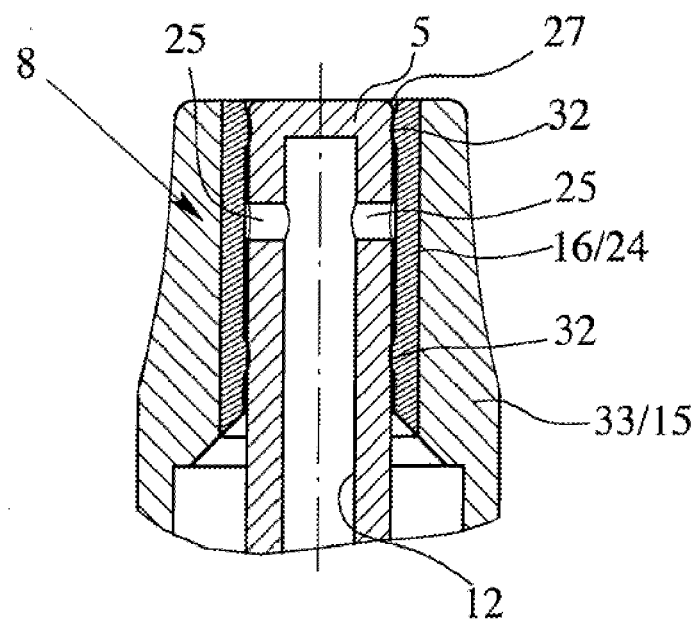
FIG. 6 shows a partial enlargement of FIG. 5.

In a schematic section, FIG. 5 shows a fourth embodiment of the proposed dispensing device 1. FIG. 6 shows a partial enlargement of the outlet valve 8.

In the fourth embodiment, in turn, a preferably linear or translational actuation of the associated dispensing valve 18 (not shown in FIGS. 5 and 6) occurs similarly to the first embodiment. Accordingly, only substantial differences with respect to the first embodiment are explained in the following.

In the fourth embodiment, the component 5 can preferably be actuated directly and manually. In particular, at least one corresponding actuation area 31 is formed here.

The valve element 24, in turn, is preferably substantially hollow and cylindrical and provided, particularly, with at least one collar 32 on the inside, here with a collar 32 in the area of each of its axial ends. The collars 32 provide an especially defined, particularly annular and sealing arrangement of the valve element 24 on the component 5 or the wall 14 thereof. The outlet opening 25 or, in the depicted example, the two outlet openings 25 ends or end between the two collars 32.

In the depicted example, the valve element 24 is held or secured by a preferably hollow and cylindrical retention part 33. The retention part 33 surrounds the valve element 24 particularly peripherally and/or over the entire axial length.

Especially preferably, the valve element 24 is injected into the retention part 33 or injected against the retention part 33. This again occurs preferably as a result of the surface of the retention part 33—the hollow and cylindrical inner circumferential surface in the depicted example—being pretreated prior to injection as already explained above in order to achieve a solid connection with the valve element 24.

The retention part 33 is then pushed up axially together with the valve element 24 onto the component 5 or the dispensing channel 12. Depending on the adaptation or radial pretensioning of the valve element 24 against the component 5 or the wall 14 thereof, further fastening or fixing of the retention part 30 on the dispensing device 1 is no longer necessary. However, the retention part 33 can also be connected additionally with the dispensing device 1 in a suitable manner or secured thereon, for example through clamping or locking To open the outlet valve 8, the valve element 24 is able to back away elastically radially toward the outside particularly in the area of its collar 32 toward the dispensing end 27 (preferably, the retention part 33 is radially recessed accordingly) in order to make it possible to thus dispense the liquid 2 or the foam or the like formed from it.

Figure 7:
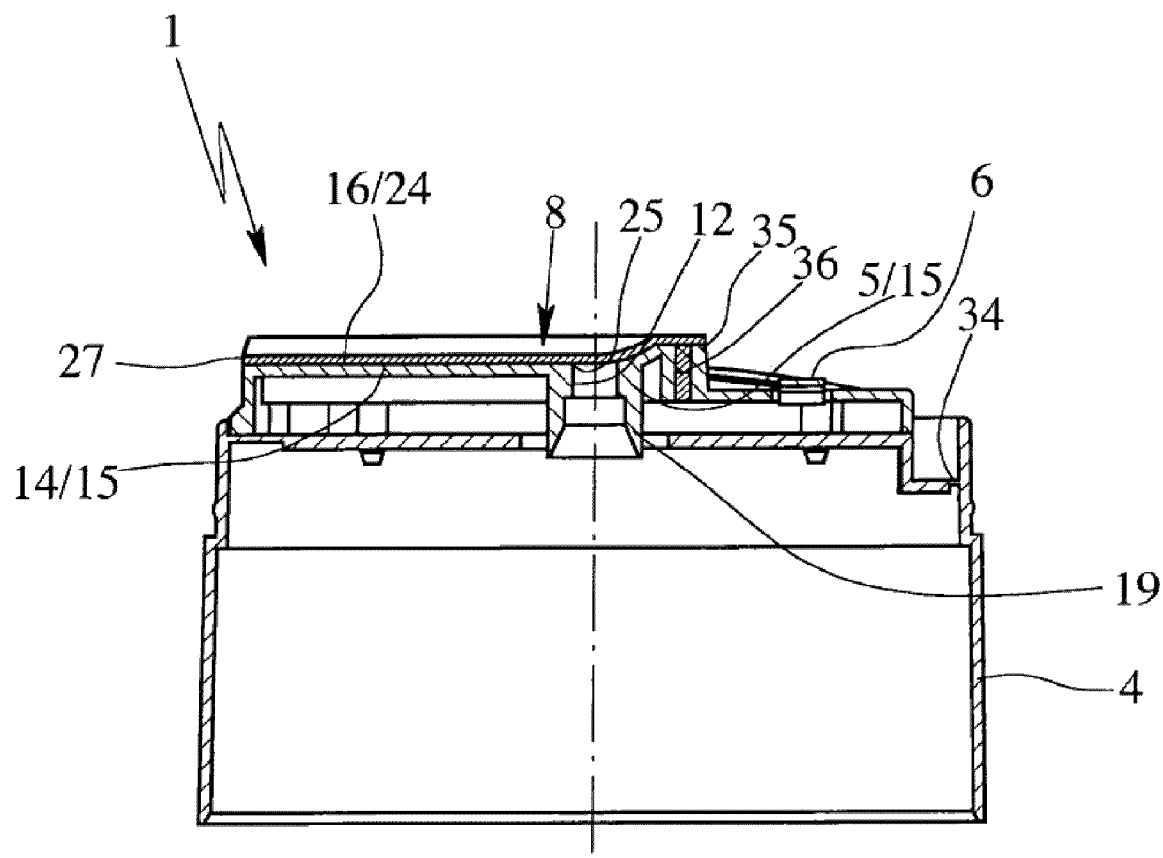
FIG. 7 shows a schematic section of a proposed dispensing device according to a fifth embodiment.
Figure 8:
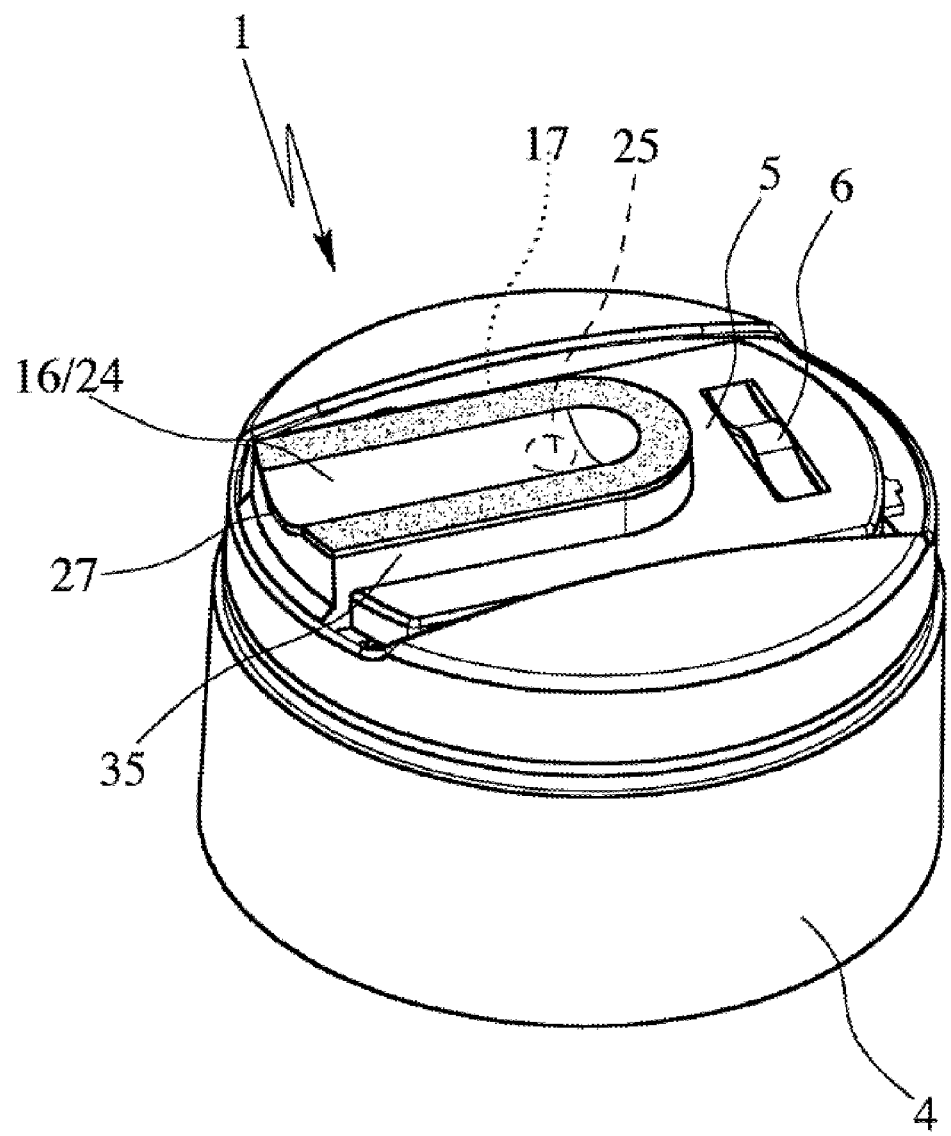
FIG. 8 shows a perspective view of the dispensing device according to FIG. 7.

FIG. 7 shows a fifth embodiment of the proposed dispensing device 1. FIG. 8 shows a perspective view of this dispensing device 1. The actuation element 9 is omitted in each case.

The fifth embodiment is very similar to the second and third embodiments with respect to the ability of the component 5 to swivel. The component 5 with the outlet valve 8 can be swiveled or tilted about a swivel axis 29 not shown in FIGS. 7 and 8 in the area of the outlet or dispensing end 27 downward from the non-actuated state shown to open the associated dispensing valve 18 (not shown). Upon the initial actuation, the preferably provided predetermined breaking point 34 breaks, which is still indicated in FIG. 7, and which is particularly embodied as a narrow crosspiece and facilitates the preferred manufacture of the housing part 4 and component 5 in a single piece.

In the fifth embodiment, the dispensing channel 12 is open on the axial end side and/or not snapped off. At its axial end, it forms the outlet opening 25 which can be covered or sealed by the valve element 24.

The outlet opening 25 preferably ends in a groove-like or concave surface of the wall 14. In particular, the valve element 25 opens in the area of the end of an oblong recess formed by the component 5 opposite the dispensing end 27 which is particularly surrounded by a preferably U-shaped edge 35 which is elevated with respect thereto. The edge 35 runs with its two preferably parallel legs in the direction of the dispensing direction, which is to say toward the dispensing end 27.

The valve element 24 is solidly and tightly held and/or joined with the component 5 at least in the area of the edge 35, as indicated schematically by the area 17 in FIG. 8. This can be performed through appropriate molding-in, clamping, injection and/or engagement into a corresponding slit, a corresponding groove 36, a recess or the like—particularly in the area of the edge 25—as indicated in FIG. 7.

The second material 16 forming the valve element 24 is injected directly on or onto or against the component 5, especially preferably again by means of "bi-injection," as already explained.

For a secure, solid and tight connection of the valve element 24 with the component 5 or the wall 14 thereof or the first material 15, a pretreatment is again preferably performed prior to the injection of the valve element 24 in the area 17 (indicated with dots in FIG. 8) in which the solid connection between valve element 24 and component 5 is desired. Especially preferably, this occurs in the area of the edge 35 and/or in an area surrounding the outlet opening 25 in an at least substantially U-shaped manner.

As in the first, second and third embodiments, according to a preferred aspect the valve element 24 lies preferably uniformly or with its entire surface on the component 5 or the wall 14 thereof along a "virtual" dispensing channel starting from the outlet opening 25 toward the dispensing end 27.

Only upon dispensing of liquid is the valve element 24 lifted up elastically from the component 5 or the wall 14 along this virtual outlet channel (this is possible since the second material 16 does not join solidly with the first material 15 of the component 5 without the aforementioned pretreatment and since no pretreatment is performed in the area of the desired virtual outlet channel), hence releasing and opening the outlet channel.

Upon conclusion of the dispensing of liquid, the outlet valve 8 or valve element 24 closes again, preferably automatically, as a result of the elastic restorative forces.

In the following, the sixth embodiment of the proposed dispensing device 1 is explained with reference to FIGS. 9 to 11, with the description focusing on essential aspects. The foregoing descriptions and explanations therefore apply particularly correspondingly or in addition.

Figure 9:
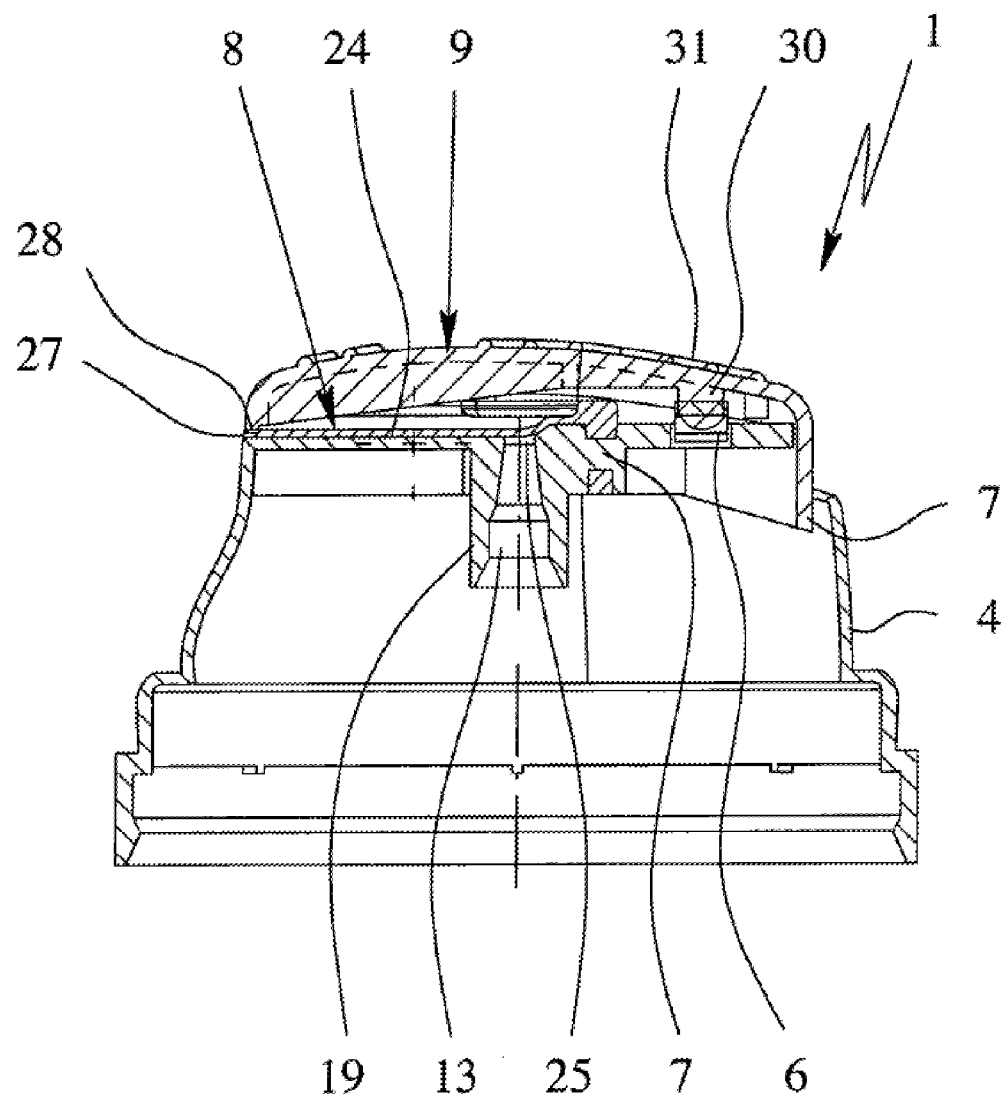
FIG. 9 shows a schematic section of a proposed dispensing device according to a sixth embodiment.

FIG. 9 shows the dispensing device 1 according to the sixth embodiment in a schematic section, again without associated container 3 and, accordingly, without associated dispensing valve 18 as well, which is preferably arranged in a fixed manner on the container 3. In a perspective view, FIG. 10 shows the dispensing device 1 without actuation element 9. FIG. 11 show the actuation element 9 particularly embodied as a covering or like a cap in a schematic section.

The stop 28 acts here particularly on the dispensing end 27 or adjacent thereto and/or from above on the valve element 24.

Especially preferably, the stop 28 does not lie directly across from the outlet opening 25 but rather is arranged such that it is transversely offset from same.

Especially preferably, the stop 28 on the one hand and the dispensing channel 12 or the outlet opening 25 on the other hand are spaced apart from each other and particularly arranged at opposing end areas of the "virtual outlet channel" formed by the valve element 24 when the outlet valve 8 is open.

In particular, the stop 28 serves to seal off the outlet valve 8 in an area of the valve element 24 which is spaced apart from the outlet opening 25 such that the valve element 24 is able to seal off the outlet opening 25 independently of the stop 28 in response to corresponding elastic restorative forces. This results in a kind of double valve or an especially good sealing or closing effect.

The stop 28 does not only act in the sixth embodiment, but rather in the other embodiments as well, particularly or essentially as a closing or return element associated with the outlet valve 8 or valve element 24. Accordingly, the term "stop" is to be preferably generally understood in this sense as well.

The stop 28 is preferably arranged or formed at a lateral or lower end of the actuation element 9. However, other constructive solutions are also possible.

In the sixth embodiment, the valve element 24 or outlet valve 8 is preferably embodied substantially according to the fifth embodiment. However, the wall 14 or the component 5 can be designed to be at least substantially level, i.e. particularly not groove-like, in the area of the overlying valve element 24.

In the sixth embodiment, the actuation element 9 is, in contrast to the third embodiment, preferably hinged on the housing part 4 and not on the component 5. This is also possible, however, in principle.

Figure 10:
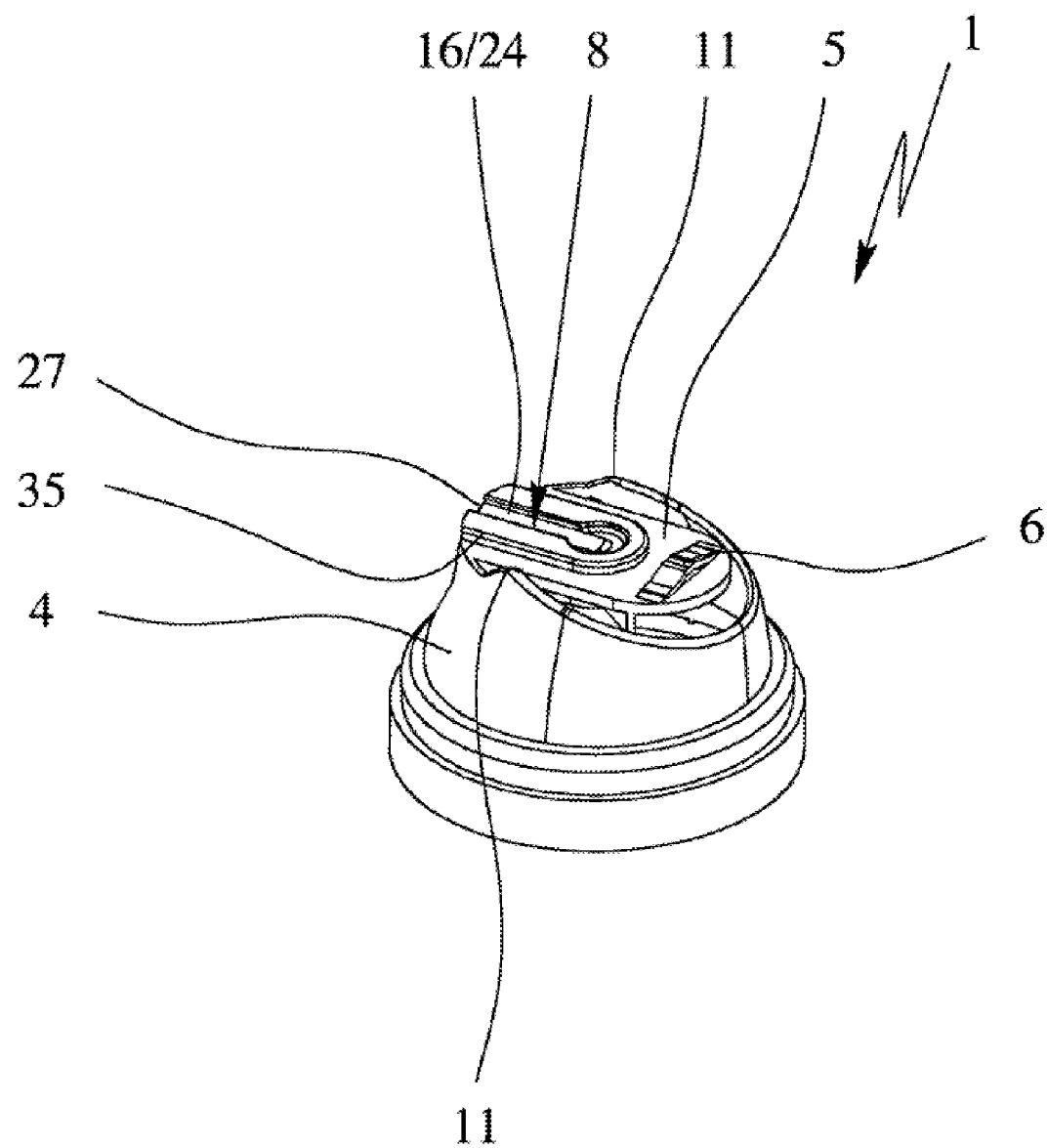
FIG. 10 shows a perspective view of the dispensing device according to FIG. 9, but without actuation element or covering.

In the sixth embodiment, the housing part 4 forms the retention sections 11 preferably through corresponding lateral projections or the like, as indicated in FIG. 10. However, other constructive solutions are also possible.

Figure 11:
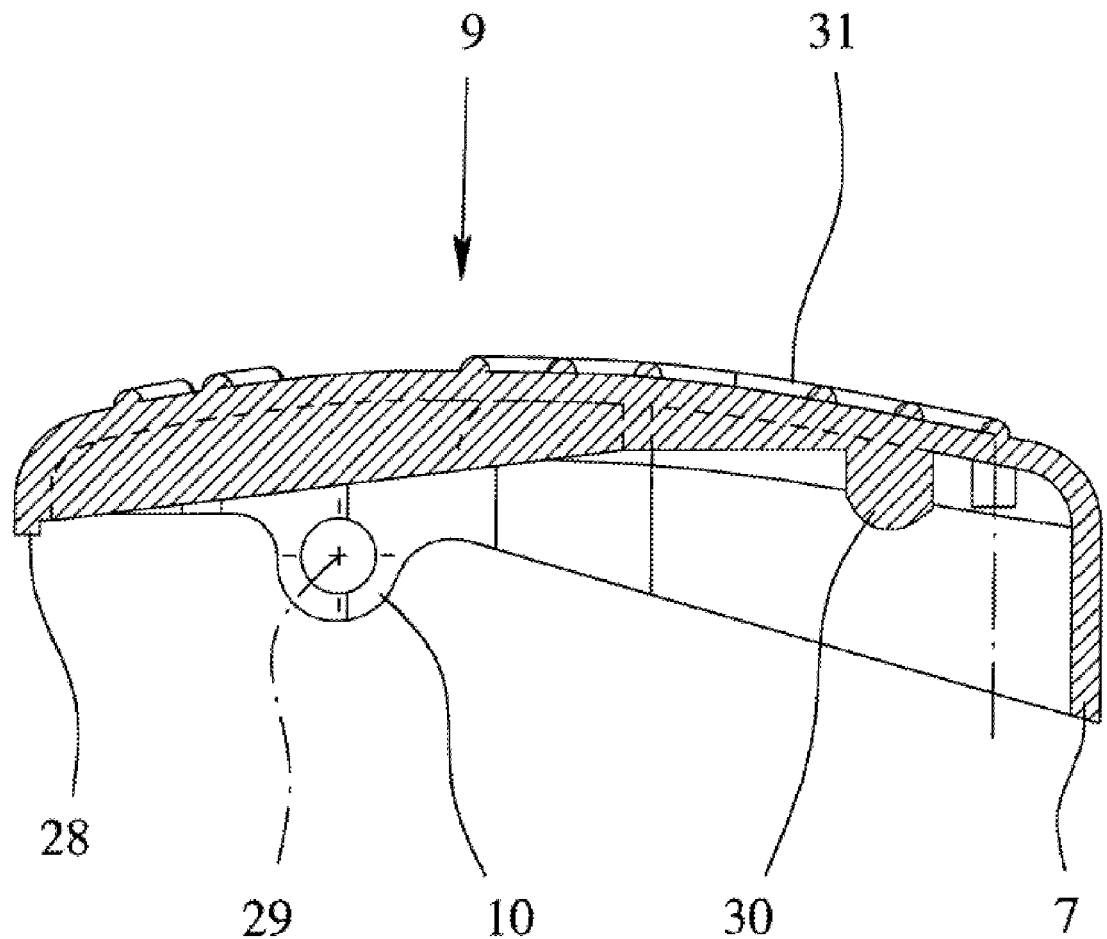
FIG. 11 shows a schematic section of the actuation element.

FIG. 11 illustrates a preferred embodiment of the mounting sections 10 as bearing lugs on the actuation element 9. Upon placement of the actuation element 9 onto the dispensing device 1 or the component 5, the retention sections 11 are able to lock or engage laterally into the bearing lugs formed by the mounting sections 10, making assembly simple. However, other constructive solutions are also possible here.

The swivel axis 29 which is schematically indicated only in FIG. 11 lies particularly nearer to the stop 28 than to the spring section 6 which brings about the return of the stop 28, so that it can exert as great a restorative force as possible.

Here, the actuation element 9 is particularly embodied in the manner of a see-saw or lever so that, upon actuation of the dispensing device through depression of an area of the actuation element 9, another area or the stop 28 is lifted and/or moved away from the valve element 24. However, other constructive solutions are also possible here.

The stop 28 is preferably rounded off and/or quite narrow or embodied as an edge in order to make it possible to exert at least substantially only linear contact and/or high contact pressure onto the valve element 24.

Preferably, the stop 28 extends over the entire width of the "virtual outlet channel," which can form between the component 5 and the valve element 24, or it can even extend laterally beyond it.

With an at least substantially level design of the component 5 or the wall 14 in the area of the overlying valve element 24, the stop 28 can preferably be accordingly embodied at least substantially as a straight edge or straight-running edge or the like.

The various embodiments and the individual features and constructive solutions of the embodiments can also be combined as desired with each other and/or used in other dispensing devices.

LIST OF REFERENCE SYMBOLS 1 dispensing device
2 liquid
3 container
4 housing part
5 component
6 spring section
7 edge
8 outlet valve
9 actuation element
10 mounting sections
11 retention section
12 dispensing channel
13 connecting part
14 wall (component)
15 first material
16 second material
17 area (pretreatment, connection)
18 dispensing valve
19 connecting section
20 connection element
21 section
22 through hole
23 riser tube
24 component/valve element
25 outlet opening
26 projection
27 dispensing end
28 stop
29 swivel axis
30 actuating section
31 actuation area
32 collar
33 retention part
34 predetermined breaking point
35 edge
36 groove

The invention claimed is:

1. A dispensing device for dispensing liquid, with a valve, which has a valve element,
wherein the valve element is injected to a wall or component and lies thereon with its entire surface and flat side when the valve is closed, wherein the valve element consists of a different material from the wall or the component,
wherein the wall or component forms a level or flat surface on which the valve element lies such that it can be lifted off and with which the valve element is connected in a U-shaped area, and wherein
the valve element is bonded solidly and two-dimensionally with the wall or the component exclusively in the U-shaped area.

2. The dispensing device as set forth in claim 1, wherein the valve opens through elastic deformation of the wall, the valve element and the component.

3. The dispensing device as set forth in claim 1, wherein the valve element lies with its surface on the wall or the component and the liquid or a product formed from it can be dispensed between the two areas whose surfaces lie against each other through corresponding elastic deformation of the valve element and/or the wall or the component.

4. The dispensing device as set forth in claim 1, wherein through elastic deformation of one or more of the component and the valve element, the outlet opening can be released for the dispensing of the liquid or a product formed from it.

5. A dispensing device for dispensing a liquid, with a valve, which has a valve element, wherein
the valve element lies on a wall with its entire or flat side when the valve is closed, wherein the valve element closes in response to elastic restorative forces, wherein the dispensing device has a stop which presses or pretensions the valve element into the closed position to securely close the valve, and wherein the stop is arranged at an actuation element, wherein the actuation element together with the stop is pivotable around a swivel axis, so that upon actuation or depressing of the actuation element the stop is lifted from the valve element.

6. The dispensing device as set forth in claim 5, wherein the valve or valve element is movable.

7. The dispensing device as set forth in claim 5, wherein the stop is coupled with the movable, operable actuation element or is molded thereon.

8. The dispensing device as set forth in claim 5, wherein the stop presses or pretensions the valve element against an outlet opening when the valve is closed.

9. The dispensing device as set forth in claim 5, wherein the stop is one or more of arranged in a spaced and in a staggered manner with respect to an outlet opening covered by the valve element, which outlet opening serves particularly to dispense the liquid or a product formed from it.

10. The dispensing device as set forth in claim 5, wherein the stop is embodied as an edge or rim of the actuation element.

11. The dispensing device as set forth in claim 5, wherein the stop extends at least over the entire width of the valve element, in which width the valve element is able to lift off from an associated wall when the valve is open or upon dispensing of liquid.

12. The dispensing device as set forth in claim 5, wherein the valve element is at least of flat, thin, plate-like and layer-like.

13. The dispensing device as set forth in claim 5, wherein the actuation element is placed on, put on, clamped on or snapped on to the dispensing device or a component thereof.

14. The dispensing device as set forth in claim 5, wherein the actuation element is mounted or held in a swiveling manner by means of mounting sections on the dispensing device or a component thereof.

15. The dispensing device as set forth in claim 5, wherein a swivel axis of the actuation element lies nearer to the stop than to a spring section which brings the return of the stop.

16. The dispensing device as set forth in claim 5, wherein the valve element is injected onto the wall.

17. A dispensing device for dispensing a cosmetic liquid, comprising:
a valve, which has a valve element, and
a swivelable actuation element,
wherein: the valve element lies on a wall with its entire surface or flat side when the valve is closed,
the actuation element is snapped on to the dispensing device or a component thereof, and
the dispensing device comprises a spring section arranged on a component and formed as one piece with the component, the spring section presses or pretensions the actuation element against an outlet opening.

18. The dispensing device as set forth in claim 17, wherein the actuation element is configured as a see-saw or lever, so that, upon actuation of the dispensing device through depression of an area of the actuation element, another area is lifted and moved away from the valve element.

19. The dispensing device as set forth in claim 17, wherein the actuation element is swivelable around a swivel axis.

20. The dispensing device as set forth in claim 19, wherein the swivel axis extends in a horizontal direction.

21. The dispensing device as set forth in claim 17, wherein the actuation element is mounted or held in a swivelling manner by means of mounting sections on the dispensing device or a component.

22. The dispensing device as set forth in claim 21, wherein the mounting sections are molded on.

23. The dispensing device as set forth in claim 17, wherein the actuation element comprises a stop, which presses or pretensions the valve element into the closed position when the valve is closed.

24. The dispensing device as set forth in claim 17, wherein the actuation element comprises an actuating section actuating on a spring section of a component.

25. The dispensing device as set forth in claim 23, wherein the stop is formed by the actuation element.

26. The dispensing device as set forth in claim 19, wherein the swivel axis of the actuation element is arranged between a stop and a spring section.

27. The dispensing device as set forth in claim 26, wherein the swivel axis lies nearer to the stop than to the spring section.

28. The dispensing device as set forth in claim 17, wherein the valve element is at least of flat, thin, plate-like and layer-like.

29. The dispensing device as set forth in claim 17, wherein the valve element is injected onto the wall.

30. A dispensing device for dispensing a liquid, comprising:
a valve, which has a valve element;
a housing part, mountable to a container; and
a component forming the valve together with the component;
wherein the valve element lies on a wall of the component with its flat side when the valve is closed, wherein the component comprises a connecting section for pluggable connection with a dispensing valve or a connecting element of the dispensing valve, wherein the connecting section extends transverse to the dispensing direction of the device, and wherein the housing part holds the component elastically in a bendable or swiveling manner, so that during actuation of the component an outlet valve of the container is openable.

31. The dispensing device as set forth in claim 5, wherein the actuation element or stop is biased into the closed position.

32. The dispensing device as set forth in claim 5, wherein the dispensing device comprises a spring portion biasing the actuation element and the stop into the closed position.

33. The dispensing device as set forth in claim 32, wherein the spring portion is formed as a single unitary piece by a housing part of the dispensing device.

34. A dispensing device for dispensing a liquid, with a valve, which has a valve element,
the valve element lies on a wall with its entire surface and flat side when the valve is closed, wherein the valve element closes in response to elastic restorative forces, wherein the dispensing device has a stop which presses or pretensiones the valve element into the closed position to securely close the valve, wherein the stop is arranged at an actuation element, wherein the actuation element together with the stop is pivotable around a swivel axis, so that upon actuation or depressing of the actuation element the stop is lifted from the valve element, wherein the dispensing device comprises a spring section portion biasing the actuation element and the stop into the closed position, and wherein the spring portion is formed as a single unitary piece by a housing part of the dispensing device.

35. The dispensing device as set forth in claim 1, wherein the valve element is adhesively bonded.

36. The dispensing device as set forth in claim 1, wherein an outlet opening is formed in the flat surface of the wall and is covered by the valve element.

37. The dispensing device as set forth in claim 1, wherein the valve element is made of TPU (thermoplastic urethane), wherein the wall or component is made of a polyolefin.

38. The dispensing device as set forth in claim 1, wherein the wall or component comprises a connection section for connecting the wall or component to a container valve.

39. The dispensing device as set forth in claim 1, wherein the connection section is made in one piece with the wall or component.

40. The dispensing device as set forth in claim 38, wherein the connection section is connected with a dispensing valve or a connecting element of the dispensing valve.

41. The dispensing device as set forth in claim 5, wherein the dispensing device or valve is connectable to a valve of a container.

42. The dispensing device as set forth in claim 5, wherein the dispensing device is mountable to a container so that upon actuation or depressing of the actuation element a container valve is opened.

43. The dispensing device as set forth in claim 41, wherein the valve of the container is depressed when the actuation element is actuated or depressed.

* * * * *